US012113298B2

(12) United States Patent
Attaja et al.

(10) Patent No.: US 12,113,298 B2
(45) Date of Patent: Oct. 8, 2024

(54) MULTIBAND ANTENNA

(71) Applicants: ARIANEGROUP SAS, Les Mureaux (FR); CENTRE NATIONAL DE LA RECHERCHE SCIENTIFIQUE, Paris (FR); UNIVERSITE DE RENNES 1, Rennes (FR)

(72) Inventors: Nicolas Attaja, Le Haillan (FR); Mauro Ettorre, Rennes (FR); Ronan Sauleau, Acigne (FR); Davy Guihard, Le Haillan (FR)

(73) Assignees: ARIANEGROUP SAS, Les Mureaux (FR); CENTRE NATIONAL DE LA RECHERCHE SCIENTIFIQUE, Paris (FR); UNIVERSIE DE RENNES 1, Rennes (FR)

( * ) Notice: Subject to any disclaimer, the term of this patent is extended or adjusted under 35 U.S.C. 154(b) by 0 days.

(21) Appl. No.: 18/688,635

(22) PCT Filed: Aug. 29, 2022

(86) PCT No.: PCT/FR2022/051615
§ 371 (c)(1),
(2) Date: Mar. 1, 2024

(87) PCT Pub. No.: WO2023/031543
PCT Pub. Date: Mar. 9, 2023

(65) Prior Publication Data

US 2024/0275047 A1 Aug. 15, 2024

(30) Foreign Application Priority Data

Sep. 2, 2021 (FR) ....................................... 2109169

(51) Int. Cl.
*H01Q 5/30* (2015.01)
*H01Q 1/28* (2006.01)

(52) U.S. Cl.
CPC ................ *H01Q 5/30* (2015.01); *H01Q 1/28* (2013.01)

(58) Field of Classification Search
CPC .................................. H01Q 5/30; H01Q 1/28
See application file for complete search history.

(56) References Cited

U.S. PATENT DOCUMENTS 5,548,299 A 8/1996 Tsuda et al.
6,281,746 B1 * 8/2001 Wood .................. H03B 5/1817 330/4.5

(Continued)

FOREIGN PATENT DOCUMENTS

EP 0556941 A1 8/1993

OTHER PUBLICATIONS

H. Huang, Y. Liu and S. Gong, "A Dual-Broadband, Dual-Polarized Base Station Antenna for 2G/3G/4G Applications," in IEEE Antennas and Wireless Propagation Letters, vol. 16, pp. 1111-1114, 2017, doi: 10.1109/LAWP.2016.2623315.

(Continued)

*Primary Examiner* — Lam T Mai
(74) *Attorney, Agent, or Firm* — Bookoff McAndrews, PLLC

(57) ABSTRACT

Antenna includes at least one first resonant cavity and a second resonant cavity, each resonant cavity being closed by a base at one end and including a radiating element superimposed on the base of the resonant cavity, the radiating element of the first cavity being able to transmit a signal on a first frequency band and the radiating element of the second cavity being able to transmit a signal on a second frequency band separate from the first frequency band, characterized in that a first distance between the base and (Continued)

radiating element of the first cavity differs from a second distance between the base and radiating element of the second cavity.

11 Claims, 3 Drawing Sheets

(56) References Cited

U.S. PATENT DOCUMENTS

| | | | | |
|---|---|---|---|---|
| 9,178,283 | B1 * | 11/2015 | Obeidat | H01Q 5/371 |
| 9,196,966 | B1 * | 11/2015 | Obeidat | H01Q 13/10 |
| 9,325,070 | B1 * | 4/2016 | Obeidat | H01Q 7/00 |
| 2007/0236405 | A1 * | 10/2007 | Jecko | H01Q 1/242<br>343/872 |
| 2009/0027294 | A1 * | 1/2009 | Bourry | H01Q 9/0421<br>343/848 |
| 2010/0060535 | A1 * | 3/2010 | Tiezzi | H01Q 1/3275<br>343/770 |
| 2014/0203973 | A1 * | 7/2014 | Chou | H01Q 9/0457<br>343/700 MS |
| 2016/0061938 | A1 * | 3/2016 | Hyman | G01S 13/0209<br>342/159 |
| 2019/0377043 | A1 * | 12/2019 | Popescu | G01R 33/341 |

OTHER PUBLICATIONS

L. Zhang et al., "Single-Feed Ultra-Wideband Circularly Polarized Antenna With Enhanced Front-to-Back Ratio," in IEEE Transactions on Antennas and Propagation, vol. 64, No. 1, pp. 355-360, Jan. 2016, doi: 10.1109/TAP.2015.2501844.

Search Report and Written Opinion issued in International Application No. PCT/FR2022/051615, mailed Dec. 12, 2022.

Search Report issued in French Application No. 2109169, mailed May 17, 2022.

Sun, Haihan & Ding, Can & Zhu, He & Jones, Bevan & Guo, Y.. (2019). Suppression of Cross-Band Scattering in Multiband Antenna Arrays. IEEE Transactions on Antennas and Propagation. pp. 10.1109/TAP.2019.2891707.

Zhu, Yufeng & Chen, Yikai & Yang, Shiwen. (2019). Decoupling and Low-Profile Design of Dual-Band Dual-Polarized Base-Station Antennas Using Frequency Selective Surface. IEEE Transactions on Antennas and Propagation. pp. 1-1. 10.1109/TAP.2019.2916730.

* cited by examiner

[Fig. 1]
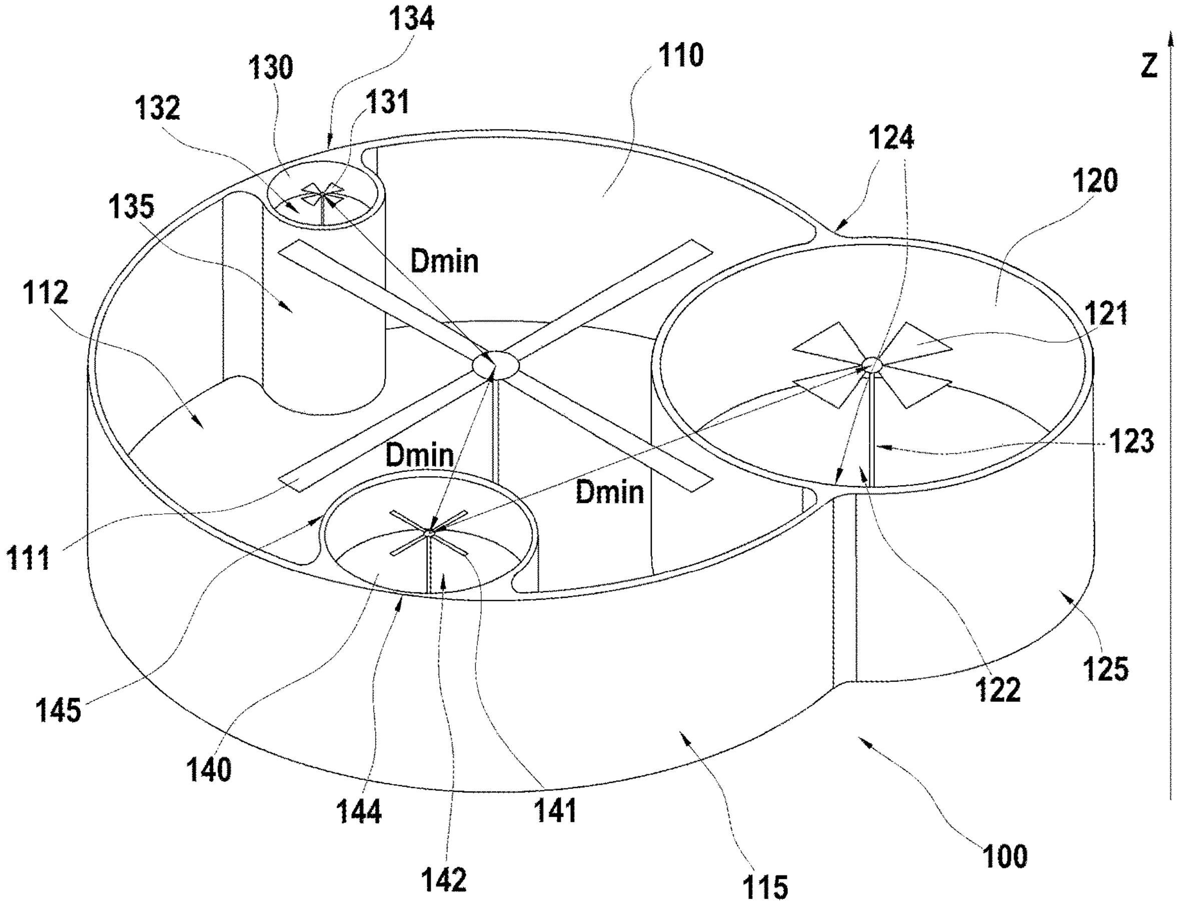
[Fig. 2]
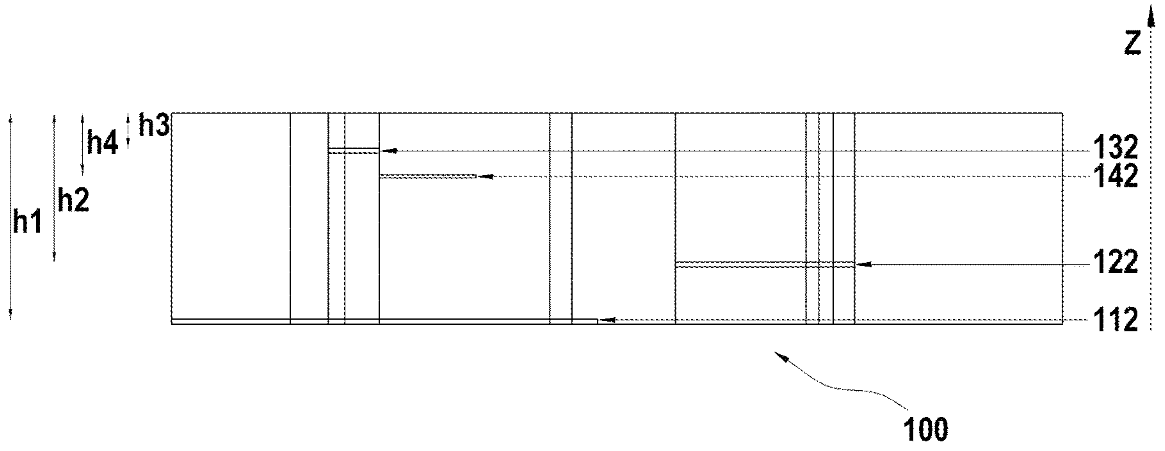

[Fig. 3]
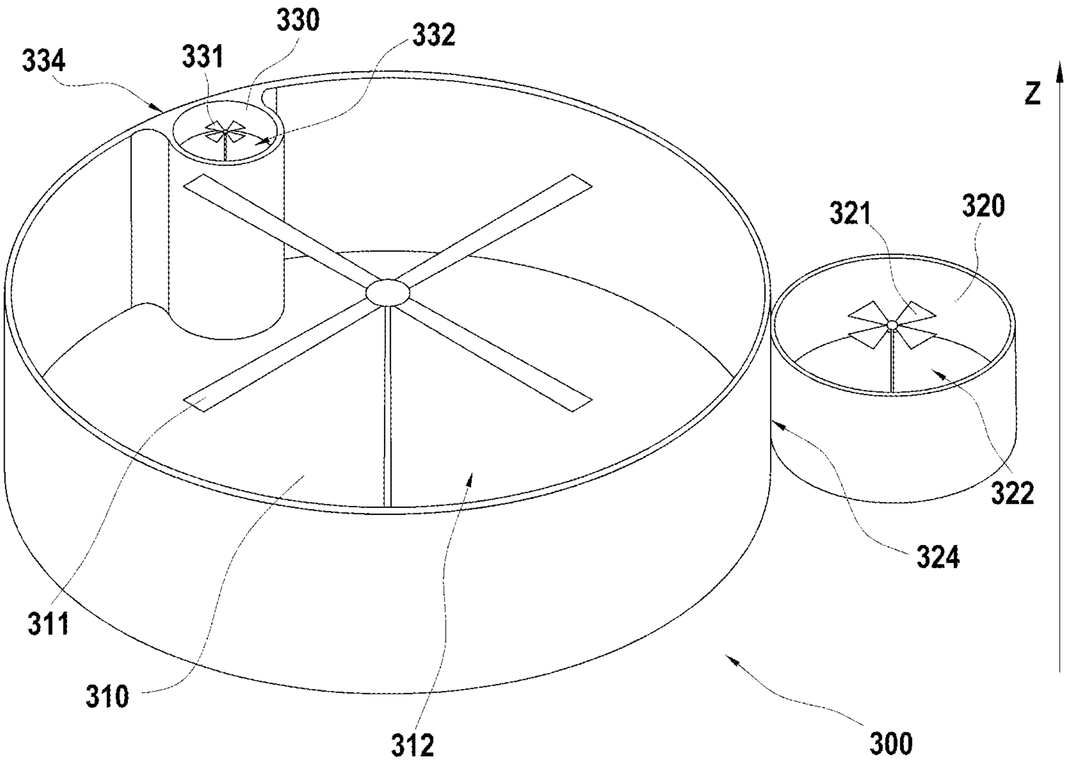

[Fig. 4]
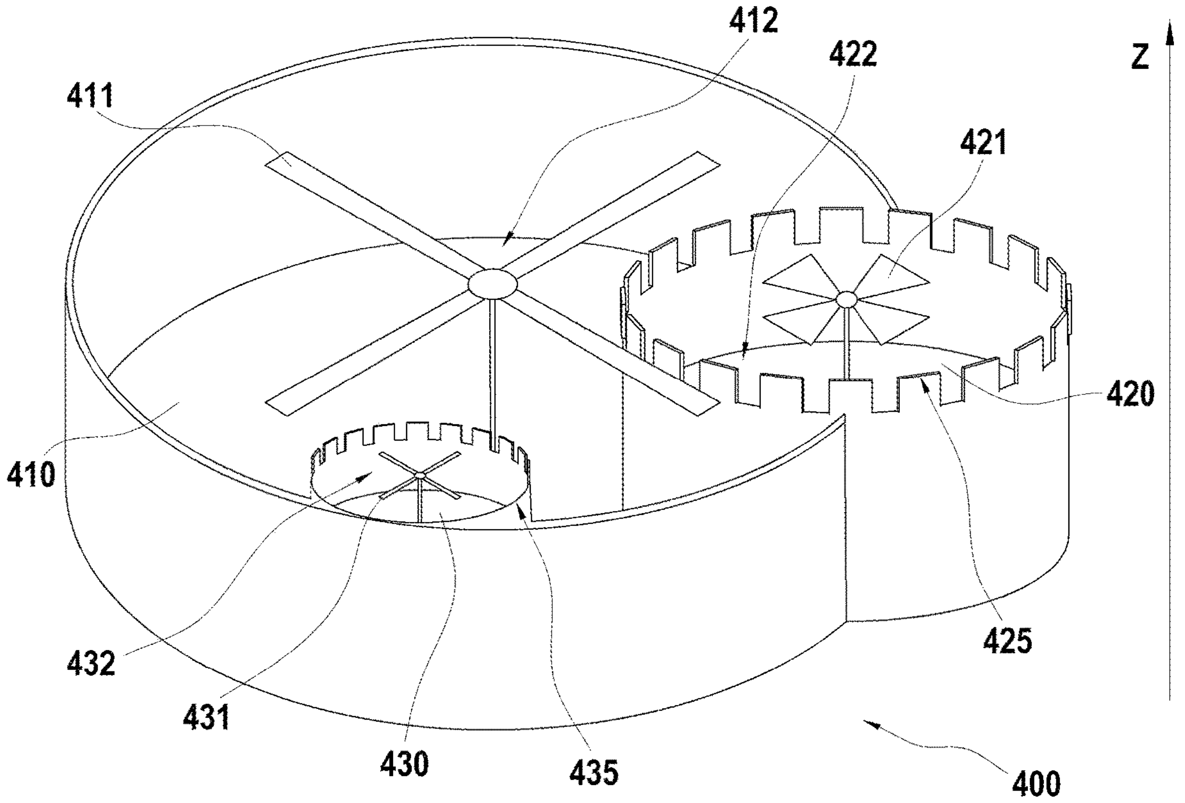

MULTIBAND ANTENNA

CROSS-REFERENCE TO RELATED APPLICATIONS

This is a National Stage Application under 35 U.S.C. § 371 of International Application No. PCT/FR2022/051615, filed Aug. 29, 2022, now published as WO 2023/031543 A1, which claims priority to French Patent Application No. 2109169, filed on Sep. 2, 2021.

TECHNICAL FIELD

The present invention relates to an antenna able to transmit over several frequency bands with wide coverage, and alone allowing the performing of several separate communication functions.

PRIOR ART

Space vehicles are equipped with antennas which ensure communication during flight phases between these vehicles and ground stations. These antennas are particularly use for telemetry, trajectory calculation, or for the Global Navigation Satellite System (GNSS).

The performing of these functions may require having recourse to a complex system comprising several antennas each one being associated with a particular function.

In some systems such as base stations, antennas are multiband, multiport antennas with a major requirement for decoupling between bands. These antennas carry out a filtering function directly, allowing simultaneous transmitting and receiving at different frequencies with low interference level.

In systems in which the platforms are mobile relative to each other, such as trains, launchers, satellites or even airplanes i.e. systems in which the wireless link is difficult to maintain, antennas having hemispherical coverage and circular polarization may be necessary to maintain the link irrespective of the orientation and altitude of the platform. In this respect, the needs for hemispherical coverage and circular polarization are added to the need for multiband.

One solution to this need is to use a single-feed very wide band or multiband antenna with circular polarization, as in the article «Single-Feed Ultra-Wideband Circularly Polarized Antenna with Enhanced Front-to-back Ratio» by L. Zhang et al., published in 2016 in *IEEE Trans. Antennas Propagation*, capable of covering all useful bands and inserting therein a multiplexing function to separate the communication chains. However, wide band and multiband antennas have unstable radiation patterns which vary as a function of the frequency and/or have weaker levels of adaptation. An increase in gain and secondary lobes can occur with an increase in frequency, which is incompatible with the strict need for hemispherical coverage.

Base stations have individual radiating elements sized for each frequency band, which do not have this issue of radiation pattern instability. In addition, arrangements which include incorporation for example as in the article «<A Dual-broadband, Dual-polarized Base Station Antenna for 2G/3G/4G Applications» by H. Huang et al. published in 2017 in IEEE Antennas and Wireless Propagation Letters, or interleaving for example as in the article «Suppression of Cross-Band Scattering in Multiband Antenna Arrays» by H. H Sun et al. published in 2019 in *IEEE Trans. Antennas Propagation*, or superimposition for example as in the article «Decoupling and Low-Profile Design of Dual-band Dual-polarized Base Station Antennas Using Frequency-selective Surface» by Y. Zhu et al. published in 2019 in *IEEE Trans. Antennas Propagation*, of the different radiating elements of base stations enable the good functioning thereof by optimizing total occupied space. However, these solutions are often limited to two or three frequency bands, since arrangements for four bands are complex. In addition, the efficiency of hemispherical coverage remains limited and coupling between the elements can be high. Finally, effects of wave diffraction between the different radiating elements occur, having an impact on the quality of circular polarization and extent of coverage.

It is therefore desirable to have available an antenna able to transmit over several separate frequency bands for the performing of several communication functions whilst maintaining compactness, good hemispherical coverage, and circular polarization in all the frequency bands of the antenna.

DISCLOSURE OF THE INVENTION

The present invention relates to an antenna comprising at least one first resonant cavity and a second resonant cavity, each resonant cavity being closed by a base at one end and comprising a radiating element superimposed on the base of the resonant cavity, the radiating element of the first cavity being able to transmit a signal on a first frequency band and the radiating element of the second cavity being able to transmit a signal on a second frequency band separate from the first frequency band, characterized in that a first distance between the base and the radiating element of the first cavity differs from a second distance between the base and the radiating element of the second cavity.

This invention allows the producing of a simple antenna architecture capable of hosting a multitude of radiating elements operating at different frequencies. With this architecture, mutual interaction between these elements is reduced. Each radiating element is therefore able to operate correctly and can therefore produce good quality polarization and hemispherical radiation pattern.

The invention also affords degrees of optimization freedom which allow reducing of the initial dimensions of the largest radiating element and the resonant cavity thereof.

According to one particular characteristic of the invention, the antenna also comprises a third resonant cavity closed by a base at one end and comprising a radiating element superimposed on the base of the third resonant cavity, the radiating element of the third cavity being able to transmit a signal on a third frequency band separate from the first and second frequency bands, and a third distance between the base and the radiating element of the third cavity differing from at least the first or second distance.

According to another particular characteristic of the invention, the antenna also comprises a fourth resonant cavity closed by a base at one end and comprising a radiating element superimposed on the base of the fourth resonant cavity, the radiating element of the fourth cavity being able to transmit a signal on a fourth frequency band separate from the first, second and third frequency bands, and a fourth distance between the base and the radiating element of the fourth cavity differing from at least the first, second or third distance.

The cavities included in the antenna are separate cavities which define separate base areas delimited by the walls of these cavities.

By having three or four cavities, it possible to obtain a triple- or quad-band antenna.

According to another particular characteristic of the invention, one wall of the first cavity and one wall of the second cavity have a common portion, the walls being other than the bases of the cavities.

The fact that there is one common portion means that it is possible to merge the walls of the first and second cavities on this common portion.

According to another particular characteristic of the invention, the first cavity and the second cavity are tangent and their walls have a common generatrix.

According to another particular characteristic of the invention, at least one portion of the second cavity is positioned inside the first cavity.

In one embodiment of the invention, the radiating elements of the resonant cavities are positioned on one same plane.

In another embodiment of the invention, the bases of the resonant cavities are positioned on one same plane.

According to one particular characteristic of the invention, the resonant cavities are single-mode or mostly single-mode on the frequency bands of the associated radiating elements.

By «single-mode», it is to be understood that only the fundamental mode of the resonant cavity under consideration is able to propagate. By «mostly single-mode», it is to be understood that the resonant cavity under consideration is single-mode over at least 50%, for example at least 75%, of the frequency band under consideration. In this case, the resonant cavity need not be single-mode on at least one end of the frequency band, and it can be no-mode or dual-mode on this end.

By having single-mode or mostly single-mode cavities on the frequency bands of the associated radiating elements, it is possible to minimize the dimensions of the antenna whilst maintaining optimal operation of the radiating elements.

According to another particular characteristic of the invention, for an antenna comprising at least three resonant cavities such as previously described, the resonant cavities distinct from the first cavity are uniformly distributed along a circumferential direction of the first resonant cavity.

This makes it possible to limit interactions between the radiating elements of the different resonant cavities.

According to another particular characteristic of the invention, the resonant cavities have an oval, circular, square, or octagonal cross-section.

According to another particular characteristic of the invention, at least one of the resonant cavities comprises an iris filtering structure, absorbents, or openings on the wall of the cavity at the end opposite the base of the resonant cavity.

A further subject of the invention is a vehicle equipped with at least one antenna of the invention.

According to one particular characteristic of the invention, the vehicle is a space vehicle.

According to another particular characteristic of the invention, the vehicle is a space launcher, an exploration vehicle, or a satellite.

This allows a vehicle to be obtained equipped with a simple antenna architecture able to receive a multitude of radiating elements operating at different frequencies with good quality polarization and hemispherical radiation pattern, for example with a coverage efficiency of the antenna architecture of 90% evaluated at −7 dBic, the gain of the antenna being determined giving consideration to circular polarization. This coverage efficiency is therefore able to meet the typical needs of a GPS geolocating system for example.

In addition, in prior art base stations, diffraction phenomena of one radiating element on another radiating element cause inverting of the direction of polarization rotation i.e. circular polarization is reversed in a given direction, changing over for example from right-hand rotation to left-hand rotation. For example, if gain is determined in right-hand circular polarization, it is ascertained that there is a sudden drop in gain at some points causing holes in the radiation pattern and leading to a drastic reduction in the level of hemispherical coverage. With the invention, it is possible to avoid this problem, since no reversal of the direction of rotation of polarization occurs on the entire upper semi-sphere. This therefore allows ensured good quality circular polarization over the entire upper semi-sphere.

BRIEF DESCRIPTION OF THE DRAWINGS

Other characteristics and advantages of the invention will become apparent from the description given below, with reference to the appended drawings illustrating examples of embodiment that are not in any way limiting.

FIG. 1 is a partial, schematic illustration of an antenna according to one embodiment of the invention.

FIG. 2 is a partial schematic illustration of a cross-section of FIG. 1.

FIG. 3 is a partial, schematic illustration of an antenna according to another embodiment of the invention.

FIG. 4 is a partial, schematic illustration of an antenna according to another embodiment of the invention.

DESCRIPTION OF EMBODIMENTS

In the entire description, by wall of a resonant cavity it is meant a wall of the cavity differing from the base thereof which extends around the axis of the height of the antenna. The perimeter of this cavity is also called the circumference of this cavity.

FIGS. 1 and 2 partially and schematically illustrate an antenna 100 according to a first embodiment of the invention, FIG. 2 being a cross-sectional view of the antenna 100.

The antenna 100 comprises four resonant cavities 110, 120, 130 and 140, and extends upwardly along an axis Z. The four cavities 110, 120, 130 and 140 are separate cavities which define separate base areas delimited by the walls of the different cavities.

The first resonant cavity 110 is closed by a base 112 at one end and comprises a radiating element 111 superimposed on the base 112 along axis Z of the height of the antenna 100. The radiating element 111 is able to transmit a signal on a first frequency band.

The second resonant cavity 120 is closed by a base 122 at one end and comprises a radiating element 121 superimposed on the base 122 along axis Z of the height of the antenna 100. The radiating element 121 is able to transmit a signal on a second frequency band separate from the first frequency band.

The distance h2 between the base 122 and the radiating element 121 of the second cavity 120 differs from the distance h1 between the base 112 and the radiating element 111 of the first cavity 110, the distances h1 and h2 being measured along axis Z of the height of the antenna.

The second cavity 120 is positioned at least partially inside the first cavity 110. Also, the wall 125 of the second cavity 120 shares two common portions 124 with the wall 115 of the first cavity 110.

The third resonant cavity 130 is closed by a base 132 at one end and comprises a radiating element 131 superimposed on the base 132 along axis Z of the height of the antenna 100. The radiating element 131 is able to transmit a signal on a third frequency band separate from the first and second frequency bands.

The distance h3 between the base 132 and the radiating element 131 of the third cavity 130 differs at least from distance h1 and/or from distance h2, the distance h3 being measured along axis Z of the height of the antenna.

The fourth resonant cavity 140 is closed by a base 142 at one end and comprises a radiating element 141 superimposed on the base 142 along axis Z of the height of the antenna 100. The radiating element 141 is able to transmit a signal on a fourth frequency band separate from the first, second and third frequency bands.

Since the four cavities are separate cavities, the radiating elements thereof therefore do not overlap. Also, to maximize the performance of the radiating elements whilst minimizing the total size of the antenna, the radiating elements of one cavity and of another cavity of smaller diameter are separated by a distance Dmin equal to the difference between the radius of the cavity and the radius of the other cavity of smaller diameter, the distance between the radiating elements of the two cavities being measured along an axis perpendicular to axis Z of the height of the antenna. More generally, the greater the distance between two radiating elements of two different cavities the better the performance in terms of coupling and diffraction.

The distance h4 between the base 142 and the radiating element 141 of the fourth cavity 140 differs at least from distance h1, from distance h2 and/or from distance h3, the distance h4 being measured along axis Z of the height of the antenna. In particular, in this embodiment, the distances h1, h2, h3 and h4 are all different. In general, the distance h between the base and the radiating element of the cavities is dependent on the transmission frequency of the radiating element, therefore the more distance h increases the more the transmission frequency decreases. Nevertheless, the distances h between the base and the radiating element of the cavities are also dependent on the type of radiating element. For example, for resonant cavities filled with a vacuum and/or a dielectric material and having a dipole as radiating element, the distance h between the base of the cavity and the dipole will be close to $\lambda_g/4$ with $\lambda_g$ the effective wavelength of the central frequency of the transmission frequency band of the dipole.

The third 130 and fourth 140 resonant cavities are positioned inside the first cavity 110, for example entirely inside the first cavity 110 as illustrated in FIG. 1. The wall 135 of the third cavity 130 and the wall 145 of the fourth cavity 140 share a common portion, 134 for the third cavity 130 and 144 for the fourth cavity 140, with the wall 115 of the first cavity 110. On the common portion 134, the walls 115 and 135 are merged, and on the common portion 144 the walls 115 and 145 are merged.

The radiating elements 111, 121, 131 and 141 can be directly powered by a coaxial cable which passes through the corresponding cavity from the base thereof as far as the radiating element, such as for example cable 123 illustrated for element 121 in the second cavity 120.

In this embodiment, the radiating elements 111, 121, 131 and 141 are positioned on one same plane, but it is also possible to have radiating elements on different planes with bases 112, 122, 132, 142 also on different planes, or with bases 112, 122, 132, 142 positioned on one same plane.

In this embodiment, the four frequency bands of the different radiating elements 111, 121, 131 and 141 are separate. For example, the four frequency bands are the UHF band between 432 MHz and 434 MHz, the GNSS band between 1164 MHz and 1591 MHz, the S band between 2200 MHz and 2290 MHz and the C band between 5400 MHz and 5900 MHz. However, it is also possible that only the two first frequency bands for example those of radiating elements 111 and 121 are separate, and that the two other frequency bands i.e. those of radiating elements 131 and 141 share common frequencies with the two first frequency bands.

FIG. 3 partially and schematically illustrates an antenna 300 according to another embodiment of the invention.

The antenna 300 comprises three resonant cavities 310, 320 and 330 and extends upwardly along axis Z. Each resonant cavity 310, 320, 330 is closed at one end by a base 312, 322, 332 and comprises a radiating element 311, 321, 331. In the invention, the radiating elements of each cavity are superimposed on the base of the cavity along axis Z of the height of the antenna 300. Also, the radiating element 311 of the first cavity 310 is able to transmit a signal on a first frequency band, the radiating element 321 of the second cavity 320 is able to transmit a signal on a second frequency band separate from the first frequency band, and the radiating element 331 of the third cavity 330 is able to transmit a signal on a third frequency band which can be separate from the first and second frequency bands or it may have frequencies common with one of the two first bands.

In addition, the distance between the base 312 and the radiating element 311 of the first cavity 310 differs at least from the distance between the base 322 and the radiating element 321 of the second cavity 320, or from the distance between the base 332 and the radiating element 331 of the third cavity 330. Similarly, the distance between the base 322 and the radiating element 321 of the second cavity 320 differs at least from the distance between the base 312 and the radiating element 311 of the first cavity 310 or from the distance between the base 332 and the radiating element 331 of the third cavity 330.

Cavity 320 is tangent to the first cavity 310 outside cavity 310. The walls of the two cavities 310 and 320 have a common portion and more particularly, in the illustrated embodiment, the cavities 310 and 320 have a common generatrix 324. The walls of cavities 310 and 320 therefore merge along this common generatrix 324. By having cavity 320 outside the first cavity and sharing a common generatrix, it is possible to limit interactions between the radiating elements of these two cavities.

Cavity 330 is also tangent to the first cavity 310, but it is positioned inside cavity 310. In similar manner to cavity 320, cavity 330 has a common generatrix 334 with cavity 310.

FIG. 4 partially and schematically illustrates an antenna 400 according to another embodiment of the invention.

The antenna 400 comprises three resonant cavities 410, 420 and 430. Each resonant cavity 410, 420, 430 is closed at one end by a base 412, 422, 432 and comprises a radiating element 411, 421, 431. In the invention, the radiating elements of each cavity are superimposed on the base of the cavity along axis Z of the height of the antenna 400. In addition, the radiating element 411 of the first cavity 410 is able to transmit a signal on a first frequency band, and radiating element 421 of the second cavity 420 is able to transmit a signal on a second frequency band separate from the first frequency band. The radiating element 431 of the third cavity 430 is able to transmit a signal on a third frequency band which can be separate from the first and second frequency bands or it may comprise frequencies common with one of the two first bands.

Additionally, the distance between the base 412 and the radiating element 411 of the first cavity 410 differs at least from the distance between the base 422 and the radiating element 421 of the second cavity 420 or from the distance between the base 432 and the radiating element 431 of the third cavity 430. Similarly, the distance between the base 422 and the radiating element 421 of the second cavity 420 differs at least from the distance between the base 412 and the radiating element 411 of the first cavity 410 or from the distance between the base 432 and the radiating element 431 of the third cavity 430.

The second cavity 420 is partially positioned inside the first cavity 410, whilst the third cavity 430 is positioned inside the first cavity 410.

The wall 425 of the second cavity 420 comprises openings over the entire circumference thereof on the end not closed by the base 422. In other words, the edge of wall 425 is crenellated thereby defining a plurality of openings. This makes it possible to obtain improved gain at low elevation angles in the high frequencies of the second frequency band whilst limiting a decrease in gain in the low frequencies of the second frequency band.

The wall 435 of the third cavity 430 comprises openings over part of the circumference thereof on the end not closed by the base 432. This allows the obtaining of improved gain at low elevation angles in the high frequencies of the third frequency band.

In all the embodiments of the invention, the resonant cavities are illustrated with a circular cross-section, nonetheless these cavities could also have any cross-section for example a square, oval, hexagonal cross-section etc . . . .

Irrespective of the embodiment of the invention the resonant cavities can be dual cavities such as described in French patent application FR 20 09240, i.e. the waveguide forming the dual cavity comprises two distinct resonant cavities one of which is positioned inside the other, and these cavities are single-mode or mostly single-mode on a separate frequency band. The radiating elements associated with the dual cavities are dual-band elements. This allows improved hemispherical coverage to be obtained on the high band associated with the dual cavity and the radiating element thereof. In addition, if the wall of the outer cavity also comprises openings, it is possible to enhance this effect without impacting the low frequency transmission band.

Irrespective of the embodiment of the invention, the resonant cavities can be single-mode or mostly single-mode on the frequency band of the radiating element associated with the cavity. This makes it possible to minimize the dimensions of the antenna whilst maintaining optimal operation of the radiating elements.

Irrespective of the embodiment of the invention, the radiating elements of the resonant cavities can be of patch, slot, or dipole type. They can be single-band or multiband. The radiating elements can also be printed on a substrate in one or more layers and/or can have dual, single, or circular polarization. If the radiating elements are printed on a substrate, the substrate can close the end of the cavity opposite the end closed by the base of the cavity. The radiating elements can also be volume elements such as metal dipoles for example able to be obtained by three-dimensional printing on metal and suspended in the resonant cavity.

Irrespective of the embodiment of the invention, the resonant cavities can be filled with a dielectric material such as a dielectric foam for example. The dielectric material can have low permittivity or high permittivity. This allows reducing of the dimensions of the resonant cavities by a factor F.

$$F=1/\sqrt{\varepsilon_r} \quad \text{[Math 1]}$$

with $\varepsilon_r$ the permittivity of the dielectric material.

Irrespective of the embodiment of the invention, the different resonant cavities of the first cavity can be distributed over the circumference of the first cavity with minimum angular spacing of $\theta_{min}=360\times(1-0.25)/n$, and maximum angular spacing of $\theta_{max}=360\times(1+0.25)/n$ between two consecutive cavities, with n being the number of different resonant cavities of the first cavity. Therefore, for three resonant cavities distributed over the circumference of the first cavity, the angular spacing $\Delta\theta$ between two consecutive cavities is 120°±30°. For two resonant cavities distributed over the circumference of the first cavity, the angular spacing $\Delta\theta$ between two consecutive cavities is 180°±45°.

Irrespective of the embodiment of the invention, the different resonant cavities of the first cavity can be uniformly distributed over the circumference of the first cavity.

Irrespective of the embodiment of the invention, in all the resonant cavities the waveguide by which they are delimited can be of same height or of different heights along axis Z of the height of the antenna.

Irrespective of the embodiment of the invention, if there are at least three resonant cavities, two thereof can be equally distanced between their base and their radiating element.

Irrespective of the embodiment of the invention, the cavities can be filled with a dielectric material, and the distance between their base and their radiating element is between $\lambda_g/8$ and $\lambda g/2$ with $\lambda_g$ being the length of the guided wave in the dielectric material.

The expression «between . . . and . . .» is to be construed as including the limits.

The invention claimed is:

1. An antenna comprising at least one first resonant cavity and a second resonant cavity, each resonant cavity being closed by a base at one end and comprising a radiating element superimposed on the base of the resonant cavity, the radiating element of the first cavity being able to transmit a signal on a first frequency band and the radiating element of the second cavity being able to transmit a signal on a second frequency band separate from the first frequency band, wherein a first distance between the base- and the radiating element of the first cavity differs from a second distance (h2) between the base and the radiating element of the second cavity, the antenna also comprising a third resonant cavity closed by a base at one end and comprising a radiating element superimposed on the base of the third resonant cavity, the radiating element of the third cavity being able to transmit a signal on a third frequency band separate from the first and second frequency bands, and a third distance between the base and the radiating element of the third cavity differing at least from the first or second distance, the different resonant cavities of the first cavity being distributed over the circumference of the first cavity with minimum angular spacing $\theta_{min}=360\times(1-0.25)/n$, and maximum angular spacing $\theta_{max}=360\times(1+0.25)/n$ between two consecutive cavities, with n the number of different resonant cavities of the first cavity.

2. The antenna according to claim 1 also comprising a fourth resonant cavity closed by a base at one end and comprising a radiating element superimposed on the base of the fourth resonant cavity, the radiating element of the fourth cavity being able to transmit a signal on a fourth frequency band separate from the first, second and third frequency bands, and a fourth distance between the base and the radiating element of the fourth cavity differing at least from the first, second or third distance.

3. The antenna according to claim 1, wherein one wall of the first cavity and one wall of the second cavity have a common portion, the walls being different from the bases of the cavities.

4. The antenna according to claim 3, wherein at least one portion of the second cavity is positioned inside the first cavity.

5. The antenna according to claim 1, wherein the radiating elements of the resonant cavities are positioned on one same plane.

6. The antenna according to claim 1, wherein the bases of the resonant cavities are positioned on one same plane.

7. The antenna according to claim 1, wherein the resonant cavities are single-mode or mostly single-mode on the frequency bands of the associated radiating elements.

8. The antenna according to claim 2, wherein the resonant cavities other than the first cavity are uniformly distributed along a circumferential direction of the first resonant cavity.

9. A vehicle equipped with at least one antenna according to claim 1.

10. The vehicle according to claim 9, wherein the vehicle is a space vehicle.

11. The vehicle according to claim 10, wherein the vehicle is a space launcher, an exploration vehicle, or a satellite.

* * * * *